(12) United States Patent
Potter

(10) Patent No.: US 7,668,475 B2
(45) Date of Patent: Feb. 23, 2010

(54) METHOD OF CONFIGURING A PRINT SYSTEM USING A DOCUMENT KEY

(75) Inventor: Scott M. Potter, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 544 days.

(21) Appl. No.: 11/443,700

(22) Filed: May 31, 2006

(65) Prior Publication Data

US 2007/0280766 A1 Dec. 6, 2007

(51) Int. Cl.
G03G 21/00 (2006.01)
G03G 15/00 (2006.01)

(52) U.S. Cl. .......................................... 399/84; 399/80

(58) Field of Classification Search ................... 400/62; 399/80, 84, 366
See application file for complete search history.

(56) References Cited

U.S. PATENT DOCUMENTS 5,729,350 A * 3/1998 Ozaki ........................ 358/296

2005/0123316 A1 * 6/2005 Hirano ........................ 399/80
2007/0223955 A1 * 9/2007 Kawabuchi et al. ........... 399/80

* cited by examiner

Primary Examiner—Leslie J Evanisko
(74) Attorney, Agent, or Firm—Fay Sharpe LLP

(57) ABSTRACT

A method of configuring a printing system includes providing a document key having an initial image and providing a printing system that includes a memory storing a first system setting. The method also includes scanning the document key and validating the initial image. The method can optionally include marking a first overlay image over at least a portion of the initial image, scanning the document key, and verifying the marking of the first overlay image thereon. The method also includes configuring or permitting the configuration of the printing system after the initial image has been validated or the marking of the first overlay, image on the initial image has been verified. A printing system that is capable of being configured using the document key is also included.

18 Claims, 5 Drawing Sheets

METHOD OF CONFIGURING A PRINT SYSTEM USING A DOCUMENT KEY

BACKGROUND

The present disclosure broadly relates to the art of printing systems and, more particularly, to a method of configuring a printing system using a document key and a printing system configurable using the same.

The terms "print", "printing" and "marking" as used herein are to be broadly interpreted to encompass any action or process involving the production or output of sheet media having text, images, graphics and/or other indicia formed thereon by any process, such as inkjet or electrophotographic processes, for example. The terms "printer" and "printing system" as used here are to be broadly interpreted to encompass any device, apparatus or system that is capable of performing a "printing" action. Examples of such equipment and/or systems include, without limitation, desktop printers, network printers, stand-alone copiers, multi-function printer/copier/facsimile devices, and high-speed printing/publishing systems. Additionally, such exemplary embodiments of equipment, systems and/or processes can utilize sheet media of any suitable type, kind, material, quality or thickness (e.g., recycled paper, plain paper, bond paper, coated paper, card stock, transparencies and/or other media), for example. Furthermore, such exemplary equipment, systems and/or processes can output indicia on such sheet media using any printing or marking substance, such as liquid ink, solid ink, toner and/or colorant, for example, in monochrome (e.g., black) or one or more colors, or any combination thereof.

Additionally, the subject matter of the present disclosure is particularly well suited for use on and in association with multiple-function printing systems and will be discussed herein with particular reference thereto. However, the subject matter of the present disclosure is capable of broad use in a wide variety of applications and environments. As such, it is to be distinctly understood that the showings and discussion herein are merely exemplary and are not intended to be limiting.

A variety of devices and/or procedures is known and has been used to provide access to configuration settings of printing systems. For example, configurable hardware components, such as single in-line package (SIP) switches, duel in-line package (DIP) switches, pins/jumpers, and rotary switches, can be included on hardware components of printing systems, such as circuit boards and other such devices, and these hardware components can be selectively manipulated to configure the printing system in the desired manner. One difficulty with such arrangements, however, is the reduced efficiency associated with manually manipulating these components both during manufacturing as well as during field service and feature upgrades. Another difficulty with using configurable hardware components is the minimal ability of the manufacturers to limit access to these components and the operational and/or performance parameters associated therewith.

In addition to using configurable hardware components, or as an alternative thereto, software control and/or configuration settings are also known and used. These software settings can normally be accessed by a repair or service technician using suitable hardware or software. Often, these configuration and/or control settings are also accessible though a user interface provided on the printing system, such as a touch screen or a display and keypad, for example. The use of such software control and/or configuration settings provides numerous benefits and advantages over the use of configurable hardware components. For example, costs associated with the hardware components and the physical assembly thereof may be reduced. Furthermore, costs associated with the manipulation of these components during the process of configuring the printing systems are minimized or possibly eliminated.

As indicated above, one difficulty that is associated with the use of configurable hardware components is that untrained or unauthorized personnel can access the components and incorrectly set or configure the system and/or components thereof. Unfortunately, similar circumstances exist with the use of software control and/or configuration settings. As such, printing systems have been developed in which at least a portion of the software configuration settings are password accessible.

However, certain challenges exist with the use of password protected configuration settings. One such difficulty is maintaining the secrecy of a password in an environment in which the password must be disclosed to numerous parties, such as service and repair technicians and trained operators, during the course of normal operation. In such situations, the password may be inadvertently disclosed or revealed without authorization to an untrained person. As a result, considerable difficulty is often encountered in attempting to prevent unauthorized access to control and/or configuration settings using password protection.

As one alternative to using password protection, or for use in conjunction therewith, printing systems are often equipped with a communication system connectible to a telephone network or data communication network (e.g., an intranet or internet). The printing system is then operative to communicate with a suitable system, network or database to obtain authorization for changes to the configuration of the printing system or to communicate such changes in an appropriate manner. However, the inclusion of such a communication system undesirably increases the cost of the printing system and also increases the complexity of the control system thereof. Additionally, not all environments in which such a printing system might be used will include a suitable telephone or data communication network.

As another alternative to using password protection, or for use in conjunction therewith, hardware devices of various types and kinds have been developed that can be used instead of, or in addition to, password accessible control and/or configuration settings. However, considerable cost and complexity is normally associated with the use of hardware keys. As such, the use of a hardware key is often not a cost effective solution due to the additional cost of the components and the increased complexity of the control system.

Accordingly, it is believed desirable to provide a printing system and method that overcomes these and other problems and disadvantages.

BRIEF DESCRIPTION

One exemplary method of configuring a printing system according to the present disclosure is provided that includes providing a document key and a printing system. The document key includes an initial image, and the printing system includes a memory storing a first system setting. The method also includes scanning the document key and validating the initial image. The method further includes configuring the printing system.

A method as recited above can optionally include marking a first overlay image on the document key over at least a portion of the initial image. The method can also optionally include scanning the document key marked with the first overlay image and verifying the marking of the first overlay image thereon.

A method as recited above can also optionally include receiving a configuration input for configuring the first system setting of the printing system, changing the first system setting to a second system setting based at least in part on the configuration input, and storing the second system setting in the memory after validating the initial image and/or verifying the marking of the first overlay image over the initial image.

Another exemplary method of configuring a printing system according to the present disclosure is provided that includes providing a printing system to be configured. The printing system includes a scanning system, a marking system and a control system in communication with the scanning system and the marking system. The control system includes a user interface, a memory and a controller in communication with the user interface and the memory. The method also includes providing a document key including an initial image, scanning the document key using the scanning system and generating initial image data corresponding to the initial image. The method further includes communicating the initial image data to the control system and determining a validity of the document key using the initial image data. The method also includes marking a first overlay image on at least a portion of the initial image of the document key, scanning the document key marked with the first overlay image using the scanning system and generating marked image data corresponding to the document key marked with the first overlay image. The method further includes communicating the marked image data to the controller and verifying the marking of the document key with the first overlay image using the marked image data. The method also includes performing an action from a group consisting of providing an associated operator with access to a configuration setting of the control system through the user interface and changing a configuration setting based at least in part upon the initial image data corresponding to the initial image.

One example of a printing system according to the present disclosure that is configurable using an associated document key having an associated initial image thereon is provided that includes an image scanning system for scanning an image on a sheet of media and outputting image data corresponding to the scanned image. A printing engine is operative to mark an image on a sheet of media, and a memory stores image validity data and a configuration setting. A controller is in communication with the image scanning system, the printing engine and the memory. The controller is adapted to receive image data from the image scanning system corresponding to the associated initial image on the associated document key. The controller is operative to compare the image data corresponding to the associated initial image with the validity data to validate the associated initial image. Upon validating the image data, the controller is operative to perform an action from a group consisting of providing access to the configuration setting stored within the memory and changing the configuration setting stored within the memory.

DETAILED DESCRIPTION

Figure 1:
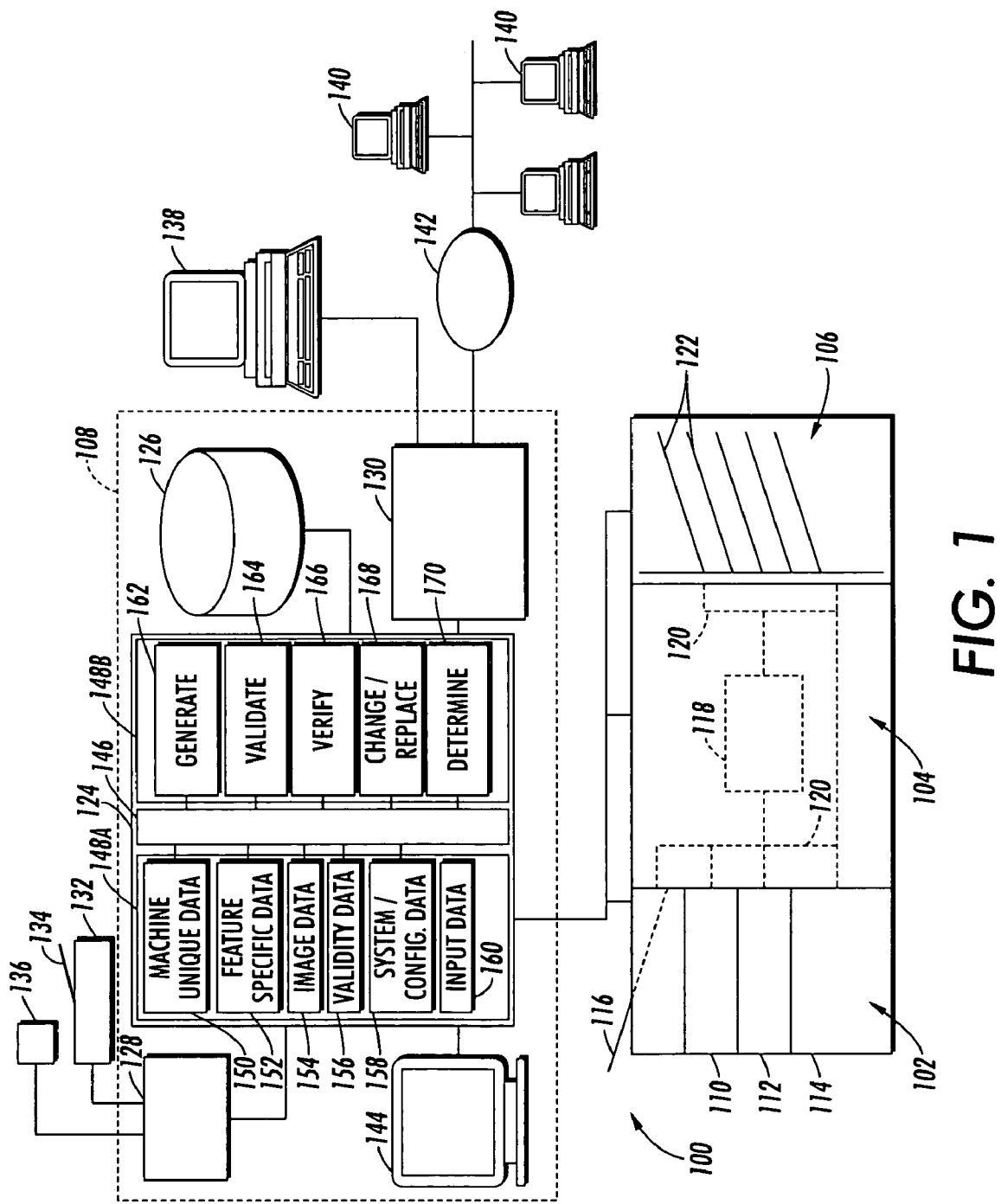
FIG. 1 is a schematic representation of one embodiment of a printing system configurable using a document key.

Turning now to the drawings wherein the showings are for the purpose of illustrating exemplary embodiments, and not for limiting the same, FIG. 1 schematically illustrates a printing system 100 that includes a sheet media source 102, a marking system 104 in operative communication with the sheet media source, and a sheet media outlet 106 in operative communication with the marking system. Printing system 100 also includes a control system 108 in communication with one or more of the sheet media source, the marking system and/or the sheet media outlet for selective operation thereof. In the embodiment shown in FIG. 1, control system 108 is in communication with each of these systems. It is to be distinctly understood, however, that aspects of the present disclosure are applicable to a wide variety of types and kinds of printing systems, and that printing system 100 is merely exemplary of one suitable printing system.

Media source 102 is shown in FIG. 1 as including multiple media supply trays 110, 112 and 114 suitable for storing bulk quantities of sheet media. Media source 102 also includes a bypass supply tray 116 capable of handling smaller quantities of sheet media. It will be appreciated that the supply trays are operative to introduce individual sheets of media to a suitable sheet feeding system or mechanism for dispensing the individual sheets. Additionally, it will be appreciated that media supply trays 110-116 are capable of receiving and supporting quantities of sheet media of any one of a variety of different sizes (e.g., letter, legal, A4) and/or orientations (e.g., short-edge first, long-edge first).

Marking system 104 includes one or more printing engines 118 in communication with media source 102 through a media transport pathway 120. It will be appreciated that the one or more printing engines can be of any suitable type or kind, and that such one or more printing engines will operate in accordance with known marking principles, such as ink jet marking or electrophotographic marking, for example.

Sheet media outlet 106 includes one or more output trays 122, and is in communication with the one or more printing engines of marking system 104 via media pathway 120. The sheet media outlet can be of any suitable type or kind, and can optionally be capable of performing one or more finishing operations of any type or kind. For example, sheet media outlet 106 could be operative to stack, collate, staple, hole punch, offset, bind, fold, insert separator sheets, and/or any combination of these or any other finishing operations. As will be recognized by one of skill in the art, sheet media is fed from media source 102 to the one or more printing engines 118 along media pathway 120. Once output by the printing engine or engines, the marked sheet media is delivered to the sheet media outlet and can simply be stacked, or one or more optional finishing operations can be performed.

Control system 108 includes a controller 124 that is in communication with media source 102, marking system 104 and sheet media output 106, each in a suitable manner. Control system 108 also includes a data storage device 126, such as a non-volatile memory or hard drive, for example, suitable for storing print jobs, settings, attributes and any other data and/or information. The data storage device is shown in FIG. 1 as being in communication with controller 124. Additionally, control system 108 can optionally include an input interface 128 and/or a communication interface 130, both of which are shown in communication with controller 124. Either or both of input interface 128 and communication interface 130 can be used to generate, receive, input or otherwise provide print jobs to the printing system. For example, input interface 128 can include a raster output scanning system 132 suitable for scanning paper documents and transmitting rasterized images of the scanned documents in the form of image data to the controller or another system or component. Scanning system 132 can optionally include an automatic document feeding device 134 or other suitable arrangement for inputting sheet media. As another example, the input section could include an optional memory device reader 136 adapted to retrieve document files, image files or other data or information from portable memory devices, such as memory cards, for example, and transmit such files, data or information to controller 124 or another system or component. As a further example, a print job could be transferred or otherwise sent to the printing system through communication interface 130 from a standalone computer 138, and/or from a computer workstation or terminal 140 through a suitable computer network 142. A print job, however transmitted or received, can be directly communicated to controller 124 for processing or the print job can be stored in a suitable manner, such as within data storage device 126, for example, until recalled for printing.

A user interface, such as a display, keyboard, pointing device or other input device, is in communication with controller 124. In one preferred embodiment, a display 144 is provided that outputs a graphical programming window to the user for communication of text, data and/or information to a user. Additionally, the user interface is adapted for user input of text, data and/or information, such as from the keyboard, pointing device or touch-screen input on display 144, for example. It will be appreciated, however, that such data can be inputted in any suitable manner.

Control system 108 also includes a processing device, which can be of any suitable type, kind and/or configuration, such as a microprocessor, for example, for processing data, executing software, and other functions relating to the performance and/or operation of printing system 100. Additionally, the control system can also include a memory of any suitable type, kind and/or configuration that can be used to store software, parameters, settings, inputs, data, values and/or other information for use in association with the performance and/or operation of the printing system. In the embodiment shown, controller 124 includes a microprocessor 146 and a memory, which is represented in FIG. 1 by boxes 148A and 148B. It will be appreciated, however, that the control system, including any controller, processing device and/or memory, can take any suitable form, configuration and/or arrangement.

Memory 148 can store or otherwise retain any suitable data, values, settings, software, algorithms, routines, programs and/or any other information, in any suitable manner or form. For example, memory 148A can optionally include machine-unique data or values 150, such as a serial number of the printing system or a component thereof, for example. Memory 148A can also optionally include feature-specific data or values 152, such as data corresponding to different features (e.g., scan-to-email), functions (e.g., system printing speed) or components (e.g., finisher capabilities) of the printing system that are installed or otherwise available, for example. Memory 148A is also operative to store image data or values 154, such as data corresponding to one or more scanned images, for example. Memory 148A can also include validity data or values 156, such as may be used to determine the validity of a scanned image, for example. Memory 148A is also shown as storing system configuration data or values 158, such as information related to a condition or state (e.g., ON/OFF, LOW/HIGH, relative percentage values) of a component or feature (e.g., color scanning capabilities, fuser module life) of the printing system. Memory 148A is also operative to store or otherwise retain input data or values 160, such as may be input by a user or operator or determined from a scanned image, for example.

Additionally, memory 148B is shown as storing or otherwise retaining a formula, algorithm, routine or program 162 for generating an overlay image, such as may be used to mark on a sheet of media or document key, for example. Memory 148B also includes a formula, algorithm, routine or program 164 for validating an input, such as a scanned image from a document key, for example. Memory 148B further includes a formula, algorithm, routine or program 166 for verifying a change of an image, such as an image on a sheet of media or document key, for example. Furthermore, memory 148B can include a formula, algorithm, routine or program 168 for changing or replacing a system configuration setting, data or value, such as a performance or operational setting of the printing system, for example. Further still, memory 148B can include a formula, algorithm, routine or program 170 for determining (e.g., retrieving or decoding) a system configuration setting, data or value from an input, such as a scanned image from a sheet of media or a document key, for example.

Microprocessor 146 is in communication with memory 148 and is operative to selectively access memory stores 150-170. For example, in validating an input, such as a scanned image from a document key, for example, microprocessor 146 can access memory store 164 to retrieve an algorithm for comparing image data from memory store 154 with validity data in memory store 156. As another example, to change or replace a system configuration setting, such as during an initial configuration or a printing system upgrade, for example, microprocessor 146 can access memory store 168 to retrieve a routine for changing or replacing a system configuration setting in memory store 158 with a new setting in memory store 160. It will be appreciated, however, that the foregoing illustrations are merely exemplary and that any other suitable processes and/or operations could alternately be performed.

Figure 2A:
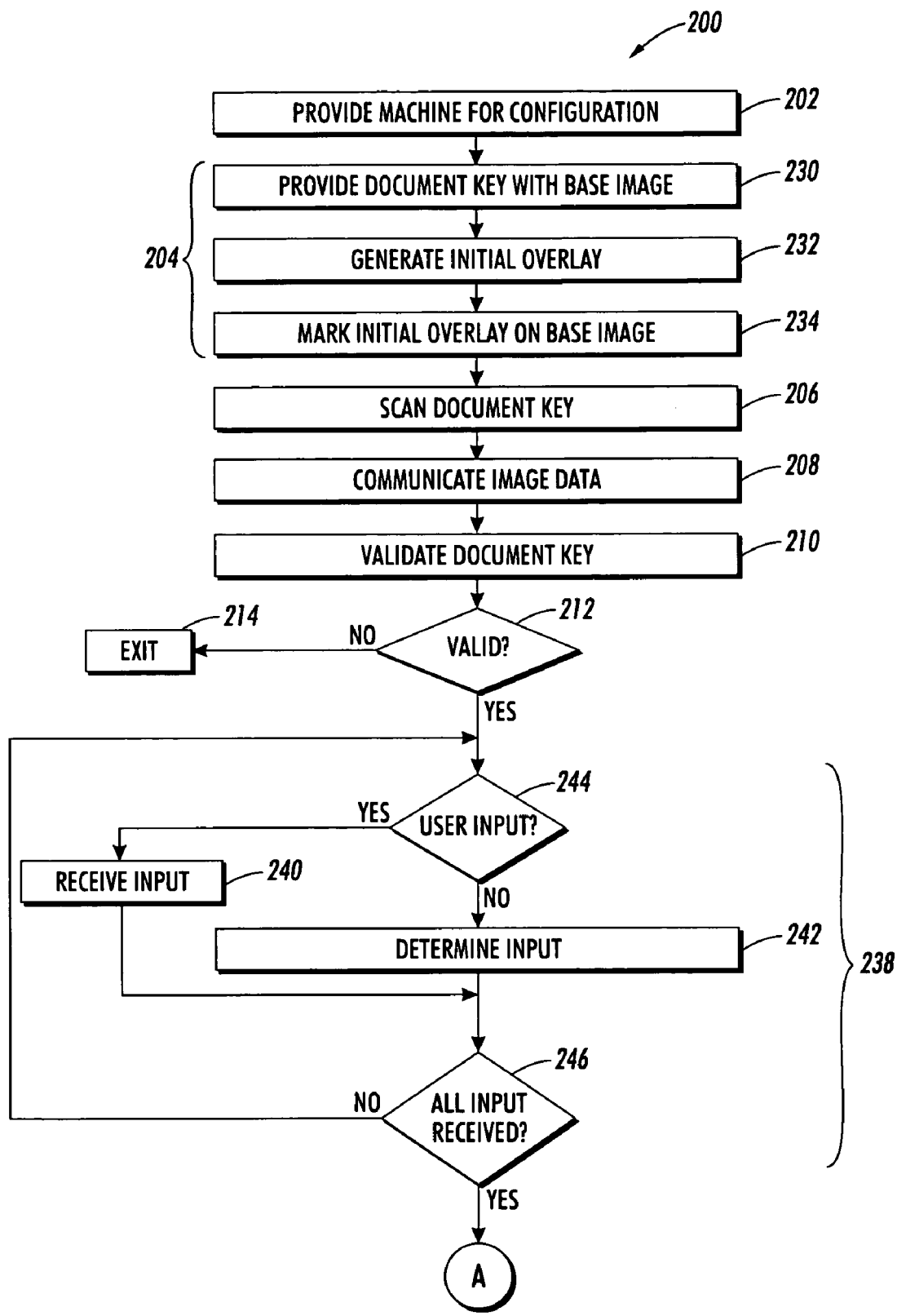
FIGS. 2A and 2B include a flowchart illustrating one method of configuring a printing system using a document key.

Turning now to FIG. 2, one exemplary method 200 of configuring a printing system, such as printing system 100, for example, includes providing a printing system for configuration, as indicated by item number 202. It will be appreciated that method 200 can be utilized for configuring a printing system under any one or more of various conditions and/or environments. For example, a manufacturer of a printing system could output a printing system that is largely unconfigured. A party, such as a dealer or customer, for example, could then utilize a method, such as method 200, for example, to configure the printing system. As another example, a customer may desire a feature enhancement to an existing printing system. A method, such as method 200, for example, could be utilized to upgrade the existing printing system to an increased output performance level (e.g., in a printing system originally operable at either 50 pages per minute or 80 ppm upgrading from the 50 ppm performance level to the 80 ppm performance level) and/or to include one or more additional features, for example. As another example, a method, such as method 200, for example, could be utilized to initiate a new feature and/or operation that was not originally built into a printing system (e.g., releasing a 65 ppm performance level where the original printing system included only 50 ppm and 80 ppm performance levels). It will be appreciated that any suitable type and/or kind of performance level and/or operational feature can be configured using a method, such as method 200, for example, such as finisher capabilities, color scanning capabilities, system performance characteristics (e.g., output speed in ppm), percentage fuser module life, regional settings (e.g., language, date configuration), user interface defaults and/or performance optimization settings, without limitation.

Method 200 also includes providing a document key suitable for enabling a party, such as a user, operator or technician, for example, to access one or more configuration settings of the printing system, as indicated by item number 204. Method 200 further includes scanning the document key using a suitable scanning system in communication with the printing system, such as scanning system 132, for example, as indicated by item number 206. It will be appreciated that the scanning system will typically generate image data corresponding to the image scanned from the document key. The image data can, in some arrangements, optionally be communicated from the scanning system to a suitable component or system, such as controller 124 of control system 108, for example. As such, method 200 can optionally include communicating image data, such as from a scanning system to another suitable component or system, as indicated by item number 208.

Method 200 also includes validating the document key prior to providing access to one or more configuration settings or at least prior to enabling any modified configuration settings, as indicated by item number 210. As such, an inquiry is made at decision box 212 as to whether the document key is valid. If a NO determination is reached, method 200 is discontinued, such as by exiting any configuration program or routine, as indicated by item number 214. If a YES determination is reached, method 200 proceeds to configuring the printing system, as indicated by item number 216.

Optionally, method 200 can further include marking a first overlay image on the document key, such as to indicate that the document key has been used in association with a printing system, for example, as indicated by item number 218. Method 200 can also optionally include scanning the document key once it has been marked with the overlay image, as indicated by item number 220. It will be appreciated that the scanning system will typically generate image data corresponding to the image scanned from the marked document key. As such, the image data may, in some applications, be communicated from the scanning system to a suitable component or system, such as controller 124 of control system 108, for example. Accordingly, method 200 can optionally include communicating image data, such as from a scanning system to another suitable component or system, as indicated by item number 222. Method 200 can also optionally include verifying that the document key has been marked with the overlay image, as indicated by item number 224. As such, an inquiry is made at decision box 226 as to whether the document key has been marked. If a NO determination is reached, method 200 is discontinued, such as by exiting any configuration program or routine, as indicated by box 228. If a YES determination is reached, method 200 can proceed to configuring the printing system, as indicated by item number 216.

A document key, as introduced in item number 204, can be provided in any suitable manner. For example, a document key having an initial image disposed thereon that is operative to provided general access to the configuration settings of a printing system can be used. Such a document key would be suitable for use on any printing system capable of recognizing the document key as a valid document key. Alternately, a universal document key having a base image disposed thereon can optionally be provided, as indicated by item number 230. An initial overlay can then be generated, as indicated by item number 232, that has, for example, a relation to a machine-unique identifier and/or a feature-specific identifier. The initial overlay can then be marked on the universal document key over the base image, as indicated by item number 234, to thereby generate a machine-specific and/or feature specific document key.

As a printing system is being configured, the first overlay image can optionally be marked on the document key, as indicated by item number 218. The first overlay image can be stored within the printing system, such as in memory 148, for example, and simply retrieved by a suitable component or system, such as microcontroller 146 of controller 124, for example, and output to the marking engine of the printing system. Alternately, method 200 can optionally include generating the first overlay image, such as by using a formula, algorithm, routine or program in memory store 162 of memory 148B, for example, as indicated by item number 236. Generating the first overlay image in such a manner can, for example, be useful for generating a machine-unique overlay using a machine-unique identifier, such as may be retrieved from memory store 150, for example, and/or for generating a feature-specific overlay using a feature-specific identifier, such as may be retrieved from memory store 152, for example.

It will be appreciated that the configuration of a printing system, that is, the input of any new configuration settings into the printing system, can occur at any suitable point in the configuration process. However, in one preferred embodiment, the new configuration setting will not be put into effect until the document key has at least been validated, as in item number 210, for example, and, more preferably, not until the marking of the document key has been verified, as in item number 220, for example. However, it is to be understood that the foregoing is merely a preferred arrangement and not a limitation.

Additionally, it will be appreciated that any new configuration settings, values, data and/or inputs, can be introduced into the printing system in any suitable manner and/or at any suitable time or occasion within a method, such as method 200, for example. As one example, method 200 includes introducing new configuration settings, values, data, inputs and/or information to the printing system, as indicated by item number 238 in FIG. 2A. Additionally, or in the alternative, method 200 can include introducing new configuration settings, values, data, inputs and/or information to the printing system to the printing system as indicated by item number 238' in FIG. 2B.

The introduction of new configuration settings, values, data, inputs and/or information can occur in any suitable manner, as indicated above. For example, item numbers 238 (and/or 238') of method 200 can include configuration settings, values, data and/or inputs being manually entered by a party, such as a user, operator or technician, for example, as indicated by item number 240. Additionally, or in the alternative, configuration settings, values, data and/or inputs can be determined by a component or system based upon other inputs, such as image data from the scanned document key, for example, as indicated by item number 242. While decision box 244 is included in FIG. 2A for purposes of completeness, it will be appreciated that configuration settings and inputs can be introduced, as indicated by item number 240 and 242, either in addition to one another or in the alternative to one another, as may be desirable in a given application. Additionally, method 200 can also optionally include an inquiry as to whether all settings, values, data, inputs and/or information has been introduced or otherwise received by the printing system for completion of the configuration process or routine, as indicated by decision box 246. If a NO determination is reached, method 200 returns for additional inputs, such as from item numbers 240 and/or 242, for example. If a YES determination is reached, method 200 can proceed to configuring the printing system as indicated by item number 216.

However, if the introduction is performed as indicated by item number 238 and the optional action of verifying that the document key has been marked with the overlay image is performed, as indicated by item number 224, a NO determination made at decision box 226 will include ignoring any settings, values, data, inputs and/or information introduced, such as at item number 238, for example, as is indicated by item number 248. If a YES determination is made at decision box 226 or the optional action of verifying that the document key has been marked with the overlay image is not performed, method 200 will reach item number 216.

Any new configuration settings, values, data and/or inputs however introduced, such as in item numbers 240 and/or 242, for example, can be used to configure the printing system in any suitable manner. For example, method 200 can also optionally include changing or otherwise replacing one or more of the initial or previous settings, values, data and/or inputs with the one or more new settings, values, data and/or inputs, as indicated by item number 250. These one or more new settings, values, data and/or inputs can then optionally be stored, such as in memory store 158 of memory 148A, for example, as indicated by item number 252. Thereafter, method 200 is discontinued, such as by exiting any configuration program or routine, as indicated by box 254.

Figure 2B:
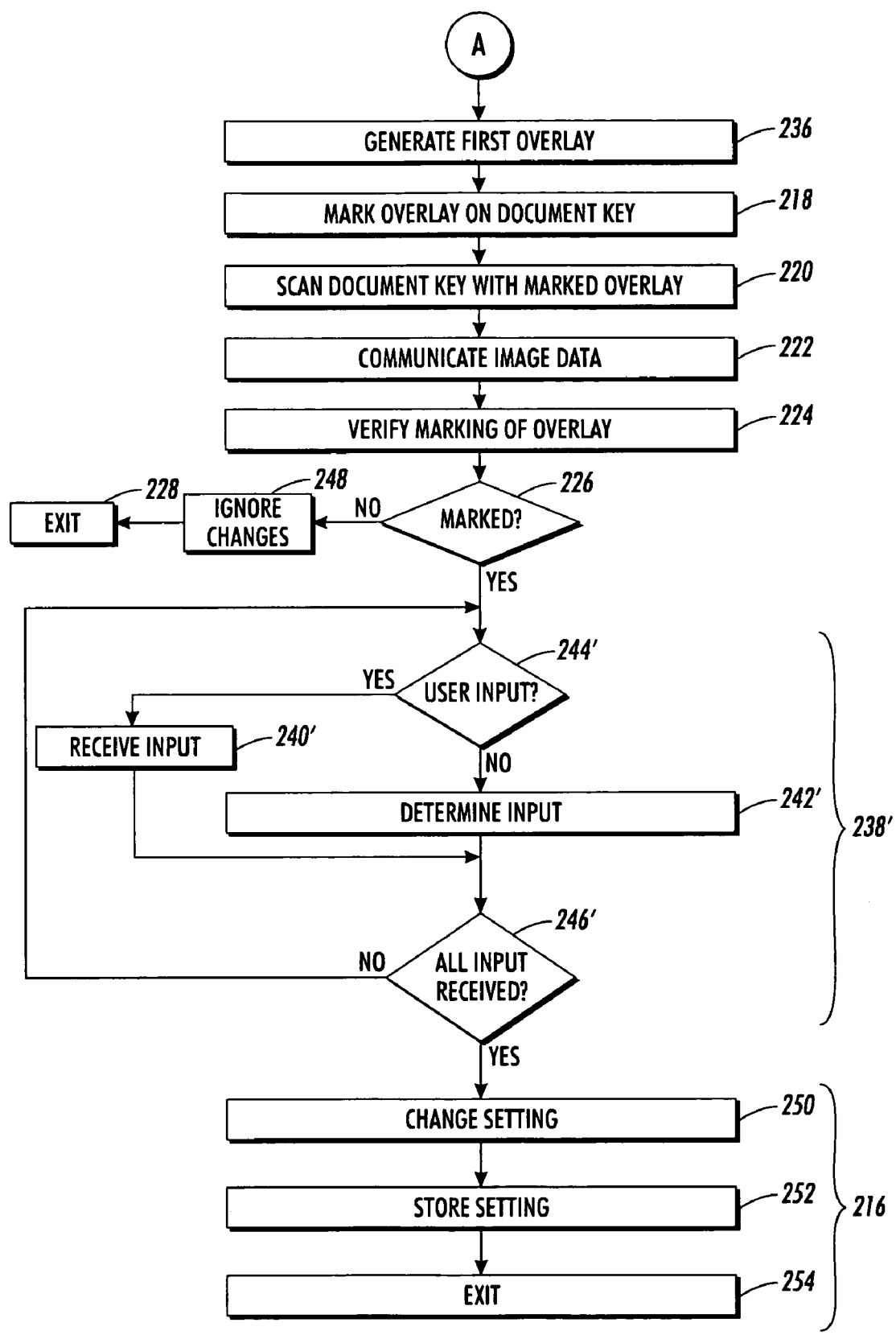

Additionally, or in the alternative, method 200 can include introducing new configuration settings, values, data, inputs and/or information to the printing system to the printing system as indicated by item number 238' in FIG. 2B. It will be appreciated that in one embodiment, this action is substantially identical to that shown and described with reference to item number 238 and, as such, includes like item numbers modified to include a prime ('). The primary distinction between the actions associated with item numbers 238 and 238' is the timing or occurrence of the actions. It will be appreciated from FIGS. 2A and 2B that item number 238 is shown as occurring after validation of the document key, such as in item number 210, for example, and prior to marking the an overlay on the document key, such as in item number 218, for example. Whereas, item number 238' is indicated as occurring after the verification and marking of the document key. As such, the actions associated with item numbers 240', 242', 244' and 246' represent actions substantially similar to those associated with item numbers 240-246, respectively, merely occurring at a different point in method 200. It will be appreciated, however, that any other configuration or arrangement of actions can alternately be used, that the actions shown and described can be performed in any suitable order, and that the method shown and described is merely exemplary.

Figure 3:
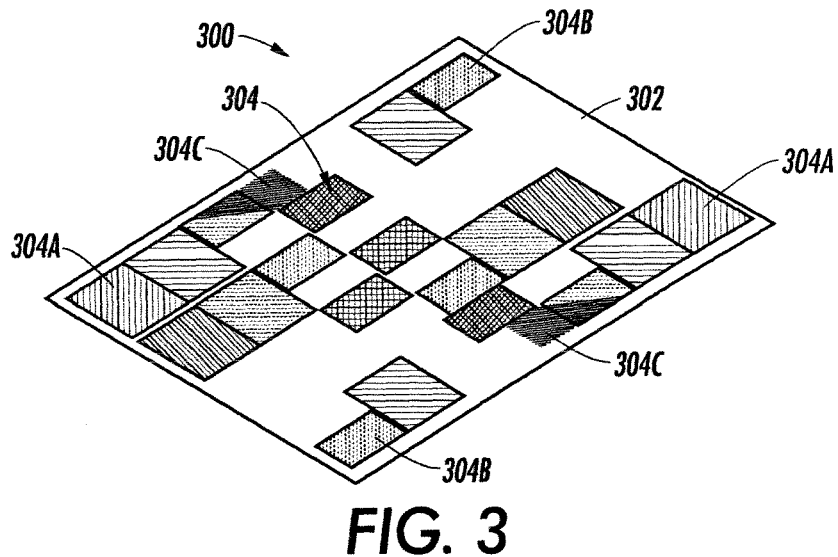
FIG. 3 is a perspective view of one embodiment of a document key for use in configuring a printing system.

FIG. 3 illustrates one exemplary embodiment of a document key 300 formed from a sheet of media 302 of any suitable type, kind, construction and/or arrangement, such as plain paper, coated paper, card stock or polymeric sheet stock, for example. A plurality of indicia 304 are disposed along sheet of media 302 and together generally form a base image, such as may be suitable for use as a universal or master configuration image, for example, as in item number 222 of method 200, for example. Several of the individual indicia are identified by item numbers 304A-C, and it will be recognized that at least a portion of the indicia are placed in a mirror image pattern. Among other benefits, such an arrangement permits the document key to be used without regard to orientation on or in a scanning system. Preferably, a base image suitable for use as a universal or master configuration image is generated in a manner that is not capable of replication using a consumer-grade printing systems.

Figure 4:
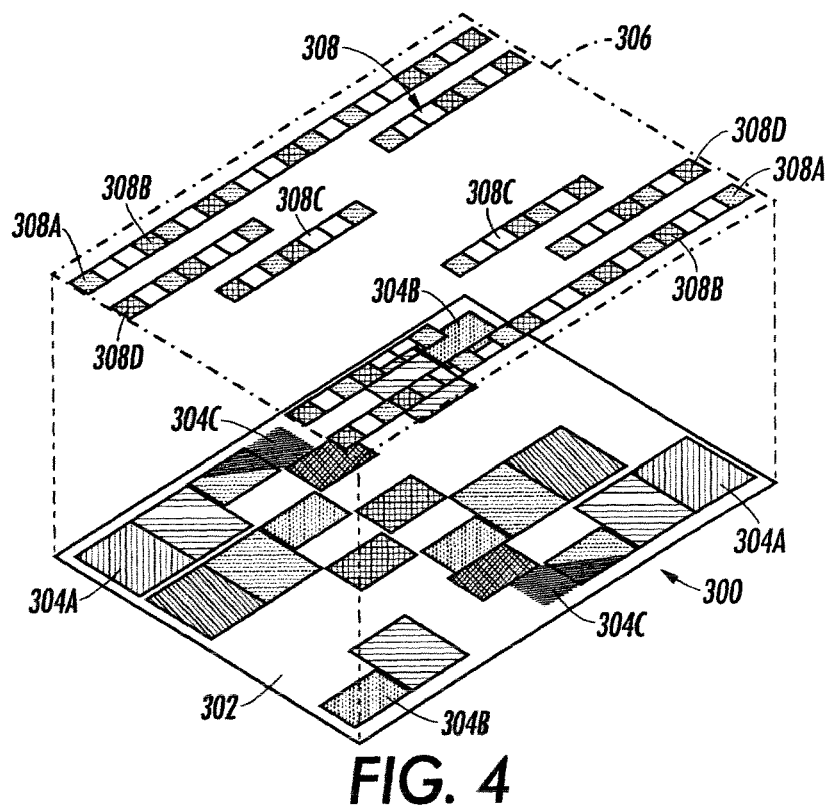
FIG. 4 is a perspective view of one embodiment of an initial overlay image shown disposed along the document key of FIG. 3.

FIG. 4 illustrates an initial overlay image 306 suitable for marking or otherwise being applied over at least a portion of the base image formed by indicia 304 on document key 300. Initial overlay image 306 is shown as being formed from a plurality of indicia 308, several of which are identified by item numbers 308A-D. Again, it will be recognized that at least a portion of the indicia are placed in a mirror image pattern. As indicated above with regard to item number 224 of method 200, an initial overlay image, such as initial overlay image 306, for example, can be generated in any suitable manner. For example, initial overlay image 306 can optionally be based, at least in part, on a machine-unique identifier and/or data, such as may be retrieved from memory store 150, for example. Additionally, or in the alternative, initial overlay image 306 can optionally be based, at least in part, on a feature-specific identifier and/or data, such as may be retrieved from memory store 152, for example.

Figure 5:
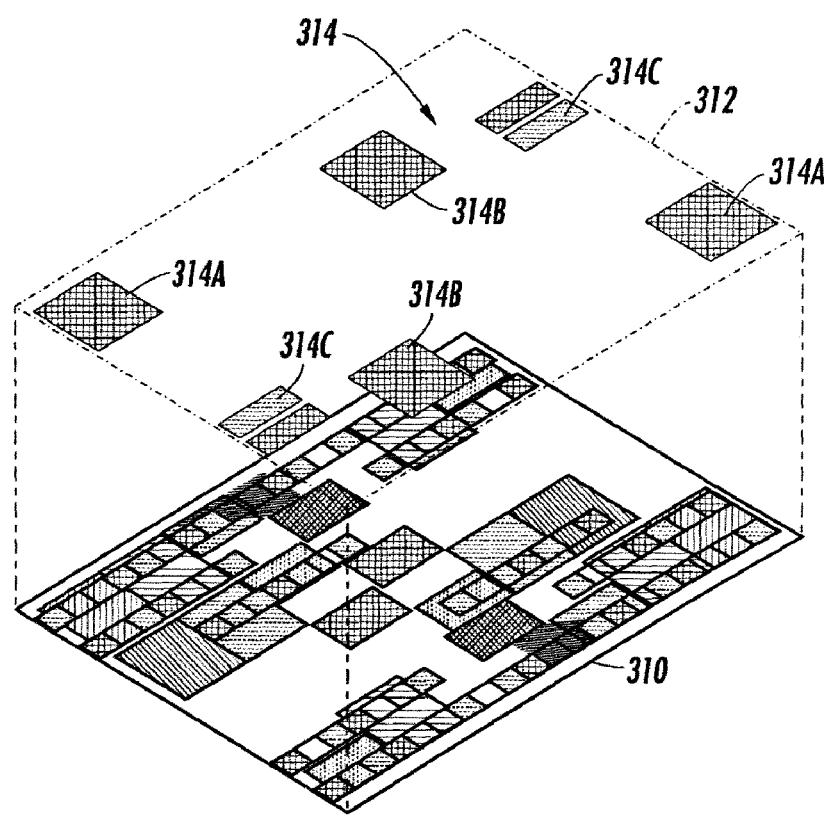
FIG. 5 is a perspective view of one embodiment of a first overlay image shown disposed along the document key of in FIG. 4.

Once initial overlay image 306 is marked or otherwise applied on or along the base image of document key 300, as indicated in item number 226 of method 200, for example, a document key 310 is formed, as shown in FIG. 5. Document key 310 is suitable for distribution for use in configuring printing systems, such as has been discussed above with regard to method 200, for example. During a printing system configuration, a first overlay image 312 can optionally be marked on document key 310, as indicated by item number 214 of method 200, for example. As shown in FIG. 5, the first overlay image is represented by a plurality of indicia 314, several of which are identified by item numbers 314A-C. Again, the mirror image relationship is maintained.

It will be recognized that square and rectangular shaped indicia are used in FIGS. 3-5. However, it is to be understood such shapes are merely representative and that any shape, shapes, pattern, patterns, image, images or any other indicia of any kind, either regular or irregular, either symmetric or asymmetric, of any color or combination of colors can be used as or in forming any one or more of the base or overlay images, without limitation. Additionally, it is to be understood that sheet media of any suitable composition, texture, finish, color, size, shape or of any other characteristic can optionally be used to form a document key. Furthermore, it will be appreciated that plurality of indicia 304, initial overlay image 306 and/or first overlay image 312 or any section, portion, area or part of any one or more thereof can optionally include settings, values, data, inputs, instructions and/or information of any suitable kind and disposed therein in any suitable manner, including being encoded or unencoded. As an example, the indicia and/or overlay image or images can include a bit pattern of 0s and 1s that can be used to set flags within the printing system directly, such as in item numbers 242 and/or 242' of method 200, for example. As another example, the indicia and/or overlay can include such a bit pattern that can be decoded into a numerical value that is passed through to an operator-selectable configuration setting, such as in item numbers 240 and/or 240' of method 200, for example.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of configuring a printing system, said method comprising:
   a) providing a document key including an initial image and a printing system including a memory storing a first system setting;
   b) scanning said document key;
   c) validating said initial image;
   d) marking a first overlay image on said document key over at least a portion of said initial image;
   e) scanning said document key marked with said first overlay image;
   f) verifying said marking of said first overlay image in d); and,
   g) configuring said printing system after verifying said marking in f).

2. A method according to claim 1, wherein g) includes:
   h) receiving a configuration input for configuring said first system setting of said printing system;
   i) changing said first system setting to a second system setting based at least in part on said configuration input; and,
   j) storing said second system setting in said memory after one of validating said initial image in c) and verifying said marking of said first overlay image in f).

3. A method according to claim 2, wherein said printing system includes a scanning system, and b) and e) include scanning said document key using said scanning system.

4. A method according to claim 2, wherein said printing system includes a marking system and d) includes marking said first overlay image using said marking system.

5. A method according to claim 2, wherein said printing system includes a controller, and c) includes validating said initial image using said controller and f) includes verifying said marking of said first overlay image using said controller.

6. A method according to claim 5, wherein said controller is in communication with said memory, and h) includes communicating said configuration input to said controller and i) includes changing said first system setting to said second system setting using said controller.

7. A method according to claim 6, wherein said printing system includes a user interface in communication with said controller, and h) includes receiving said configuration input as one of a graphically selected user input displayed on said user interface and an input data value entered using said user interface.

8. A method according to claim 2, wherein said initial image comprises a base image and an initial overlay image, and a) includes providing a base document including said base image and marking said initial overlay image along at least a portion of said base image.

9. A method according to claim 8, wherein said memory is storing a machine-unique data value, and d) includes generating said first overlay image based at least in part on said machine-unique data value.

10. A method according to claim 8, wherein said memory is storing a feature-specific data value corresponding to an associated feature available on said printing system, and d) includes generating said first overlay image based at least in part on said feature-specific data value.

11. A method of configuring a printing system, said method comprising:
   a) providing a printing system to be configured, said printing system including a scanning system, a marking system, and a control system in communication with said scanning system and said marking system, said control system including a user interface, a memory and a controller in communication with said user interface and said memory;
   b) providing a document key including an initial image thereon;
   c) scanning said document key using said scanning system and generating initial image data corresponding to said initial image;
   d) communicating said initial image data to said control system and determining a validity of said document key using said initial image data;
   e) marking a first overlay image on at least a portion of said initial image of said document key;
   f) scanning said document key marked with said first overlay image using said scanning system and generating marked image data corresponding to said document key marked with said first overlay image;
   g) communicating said marked image data to said controller and verifying said marking of said document key with said first overlay image using said marked image data; and,
   h) performing an action selected from the group consisting of:
      h1) providing an associated operator with access to a configuration setting of said control system through said user interface; and,
      h2) changing a configuration setting based at least in part upon said initial image data corresponding to said initial image.

12. A method according to claim 11, wherein said configuration setting includes an initial setting value stored in said memory, and h1) includes receiving a first setting value from the associated operator and replacing said initial setting value with said first setting value using said controller.

13. A method according to claim 11, wherein said initial image includes a base image and an initial overlay image, and b) includes generating said document key by providing a base document including a base image and marking an initial image overlay on at least a portion of said base image to form said initial image.

14. A method according to claim 11 further comprising determining a first setting value from one of said initial image data and said marked image data using said controller.

15. A method according to claim 14, wherein said configuration setting includes an initial setting value stored in said memory, and h2) includes changing said initial setting value to said first setting value using said controller.

16. A method according to claim 11, wherein c) includes introducing said document key to said scanning system.

17. A method according to claim 16, wherein said marking system includes a sheet media input, a sheet media output, and a marking engine operatively disposed between said sheet media input and said sheet media output, and e) includes removing said document key from said scanning system and introducing said document key to said marking system through said sheet media input.

18. A method according to claim 17, wherein f) includes removing said document key marked with said first overlay image from said sheet media output of said marking system and introducing said document key marked with said first overlay image to said scanning system.

* * * * *